United States Patent
Sandhu et al.

(10) Patent No.: US 7,436,903 B2
(45) Date of Patent: Oct. 14, 2008

(54) MULTICARRIER TRANSMITTER AND METHOD FOR TRANSMITTING MULTIPLE DATA STREAMS WITH CYCLIC DELAY DIVERSITY

(75) Inventors: Sumeet Sandhu, San Jose, CA (US); Minnie Ho, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 785 days.

(21) Appl. No.: 10/954,734

(22) Filed: Sep. 29, 2004

(65) Prior Publication Data

US 2006/0068698 A1  Mar. 30, 2006

(51) Int. Cl.
*H03C 7/00* (2006.01)

(52) U.S. Cl. .............. 375/315; 375/343; 375/344; 455/71; 455/75; 455/136; 455/255; 331/34

(58) Field of Classification Search ............. 375/315, 375/299, 267; 455/101
See application file for complete search history.

(56) References Cited

U.S. PATENT DOCUMENTS 6,842,487 B1 * 1/2005 Larsson .............. 375/260
2003/0026348 A1 * 2/2003 Llang et al. ........... 375/267
2003/0099304 A1 5/2003 Gore et al.
2004/0141548 A1 * 7/2004 Shattil .................. 375/146
2005/0254592 A1 * 11/2005 Naguib et al. ......... 375/267
2006/0067421 A1 * 3/2006 Walton et al. ......... 375/267

OTHER PUBLICATIONS

Huebner, "A simple space-frequency coding scheme with cyclic delay diversity for OFDM", 5th European Personal Mobile Communications Conference, 2003 (Conf. Publ. No. 492) Apr. 22-25, 2003 pp. 106-110.*
Dammann, "Beamforming in combination with space-time diversity for broadband OFDM systems", ICC 2002. IEEE International Conference on Communications, 2002, vol. 1, Apr. 28-May 2, 2002 pp. 165-171.*
Bauch, "Orthogonal frequency division multiple access with cyclic delay diversity", 2004 ITG Workshop on Smart Antennas, Mar. 18, 2004 pp. 17-24.*

* cited by examiner

*Primary Examiner*—Mohammad Ghayour
*Assistant Examiner*—Juan A. Torres
(74) *Attorney, Agent, or Firm*—Schwegman, Lundberg & Woessner, P.A.; Gregory J. Gorrie

(57) ABSTRACT

A multicarrier transmitter may transmit cyclically delayed linear combinations of two or more data streams with three or more antennas. In some embodiments, the multicarrier transmitter may transmit cyclically delayed linear combinations of three data streams with four antennas.

24 Claims, 6 Drawing Sheets

FIG. 4A $$Hx = \begin{bmatrix} h_{11} & h_{12} & h_{13} \\ h_{21} & h_{22} & h_{23} \end{bmatrix} \begin{bmatrix} x_1 \\ x_2 \\ (1/\sqrt{2})(x_1+x_2)e^{j\theta k} \end{bmatrix} = \begin{bmatrix} h_{11} + (1/\sqrt{2})h_{13}e^{j\theta k} & h_{12} + (1/\sqrt{2})h_{13}e^{j\theta k} \\ h_{21} + (1/\sqrt{2})h_{23}e^{j\theta k} & h_{22} + (1/\sqrt{2})h_{23}e^{j\theta k} \end{bmatrix} \begin{bmatrix} x_1 \\ x_2 \end{bmatrix}$$

FIG. 4B $$Hx = \begin{bmatrix} h_{11} & h_{12} & h_{13} \\ h_{21} & h_{22} & h_{23} \end{bmatrix} \begin{bmatrix} x_1 + x_2 e^{j\theta k} \\ (x_1+x_2)e^{j2\theta k} \\ x_1 e^{j2\theta k} + x_2 \end{bmatrix} = \begin{bmatrix} h_{11} + h_{12}e^{j\theta k} + h_{13}e^{j2\theta k} & h_{11}e^{j2\theta k} + h_{12}e^{j\theta k} + h_{13} \\ h_{21} + h_{22}e^{j\theta k} + h_{23}e^{j2\theta k} & h_{21}e^{j2\theta k} + h_{22}e^{j\theta k} + h_{23} \end{bmatrix} \begin{bmatrix} x_1 \\ x_2 \end{bmatrix}$$

FIG. 4C $$Hx = \begin{bmatrix} h_{11} & h_{12} & h_{13} & h_{14} \\ h_{21} & h_{22} & h_{23} & h_{24} \end{bmatrix} \begin{bmatrix} x_1 \\ x_1 e^{j\theta k} \\ x_1 e^{j2\theta k} \\ x_1 e^{j3\theta k} \end{bmatrix} = \begin{bmatrix} h_{11} + h_{12}e^{j\theta k} + h_{13}e^{j2\theta k} + h_{14}e^{j3\theta k} \\ h_{21} + h_{22}e^{j\theta k} + h_{23}e^{j2\theta k} + h_{24}e^{j3\theta k} \end{bmatrix} \begin{bmatrix} x_1 \end{bmatrix}$$

FIG. 4D $$Hx = \begin{bmatrix} h_{11} & h_{12} & h_{13} & h_{14} \\ h_{21} & h_{22} & h_{23} & h_{24} \end{bmatrix} \begin{bmatrix} x_1 \\ x_2 e^{j\theta k} \\ x_1 e^{j\theta k} \\ x_2 e^{j\theta k} \end{bmatrix} = \begin{bmatrix} h_{11} + h_{13}e^{j\theta k} & h_{12} + h_{14}e^{j\theta k} \\ h_{21} + h_{23}e^{j\theta k} & h_{22} + h_{24}e^{j\theta k} \end{bmatrix} \begin{bmatrix} x_1 \\ x_2 \end{bmatrix}$$

FIG. 4E $$Hx = \begin{bmatrix} h_{11} & h_{12} & h_{13} & h_{14} \\ h_{21} & h_{22} & h_{23} & h_{24} \end{bmatrix} \begin{bmatrix} x_1 e^{j\theta_1 k} + x_2 e^{j\theta_2 k} + x_3 e^{j\theta_3 k} \\ x_1 e^{j2\theta_1 k} + x_2 e^{j2\theta_2 k} + x_3 e^{j2\theta_3 k} \\ x_1 e^{j3\theta_1 k} + x_2 e^{j3\theta_2 k} + x_3 e^{j3\theta_3 k} \\ x_1 e^{j4\theta_1 k} + x_2 e^{j4\theta_2 k} + x_3 e^{j4\theta_3 k} \end{bmatrix} = \begin{bmatrix} \sum_{i=1}^{} h_{1i}e^{ji\theta_1 k} & \sum_{i=1}^{} h_{1i}e^{ji\theta_2 k} & \sum_{i=1}^{} h_{1i}e^{ji\theta_3 k} \\ \sum_{i=1}^{} h_{2i}e^{ji\theta_1 k} & \sum_{i=1}^{} h_{2i}e^{ji\theta_2 k} & \sum_{i=1}^{} h_{2i}e^{ji\theta_3 k} \end{bmatrix} \begin{bmatrix} x_1 \\ x_2 \\ x_3 \end{bmatrix}$$

MULTICARRIER TRANSMITTER AND METHOD FOR TRANSMITTING MULTIPLE DATA STREAMS WITH CYCLIC DELAY DIVERSITY

TECHNICAL FIELD

Various embodiments of the present invention pertain to wireless communications. Some embodiments pertain to multicarrier communications and some embodiments pertain to wireless local area networks.

BACKGROUND

Multipath fading is a problem with many wireless communication systems, particularly in systems that use multicarrier communication signals, such as orthogonal frequency division multiplexed (OFDM) systems. Multipath fading, among other things, reduces the quality of communications and results from a partial or full cancellation of signals arriving at a receiver through different paths. Some multicarrier communication systems use more than one antenna to transmit more than one data stream to a receiver. Multipath fading reduces the ability of these systems to convey data. Thus, there are general needs for multicarrier communication systems and methods that convey multiple data streams.

BRIEF DESCRIPTION OF THE DRAWINGS

FIGS. 3A through 3E illustrate cyclic shifting and linear combining of time-domain samples in accordance with some embodiments of the present invention;

FIGS. 4A through 4E illustrate signal representations in the frequency domain in accordance with some embodiments of the present invention.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
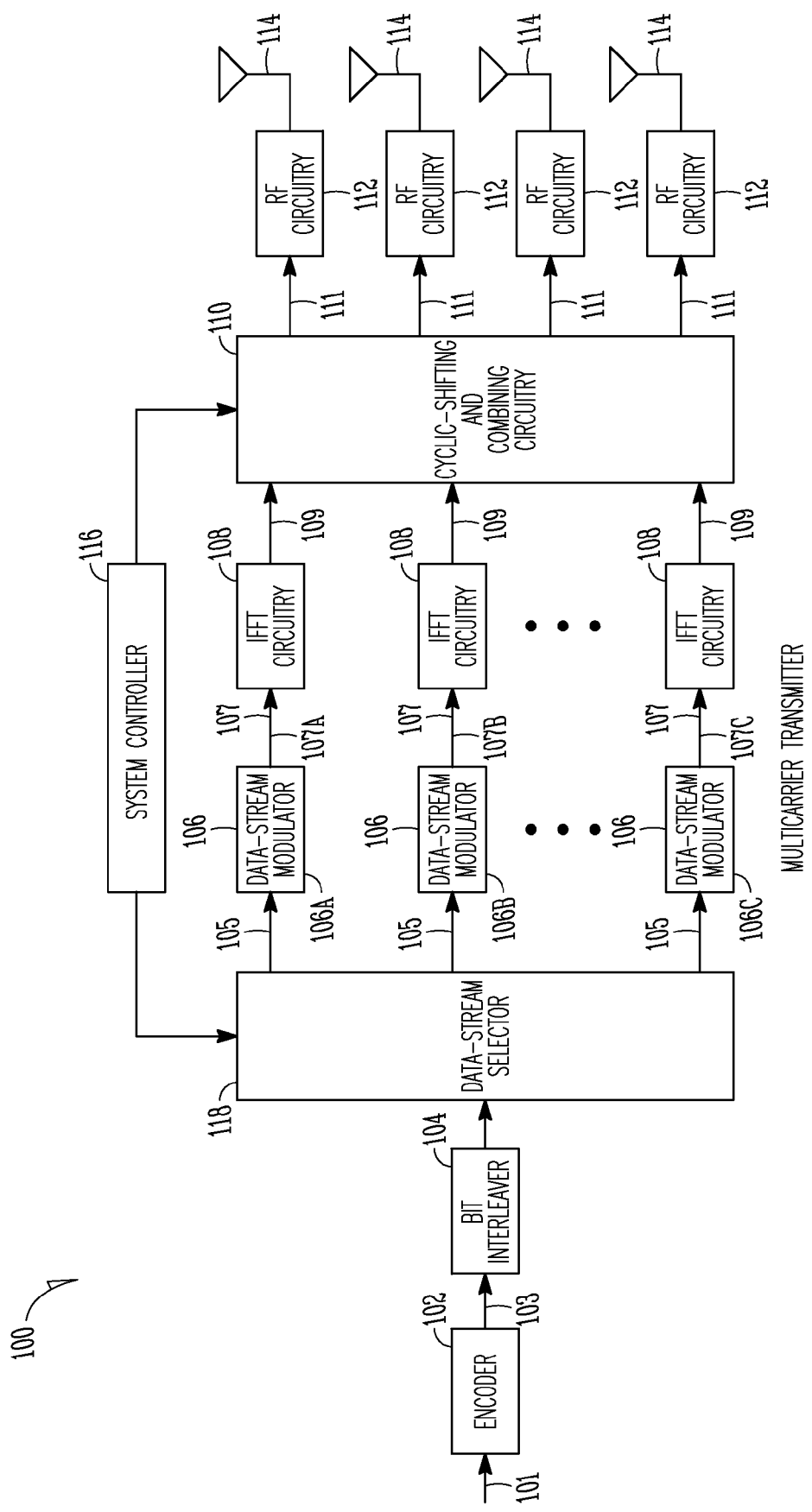
FIG. 1 is a block diagram of a multicarrier transmitter in accordance with some embodiments of the present invention.

FIG. 1 is a block diagram of a multicarrier transmitter in accordance with some embodiments of the present invention. Multicarrier transmitter 100 may transmit cyclically shifted linear combinations of two or more data streams with two or more antennas. This may help reduce the effects of multipath fading. In some embodiments, multicarrier transmitter 100 may be part of a wireless communication device, and may transmit multicarrier communication signals, such as orthogonal frequency division multiplexed (OFDM) communication signals, although the scope of the invention is not limited in this respect.

In some embodiments, multicarrier transmitter 100 may utilize more than one of spatially-diverse antennas 114 to "divide" the channel into one or more spatial channels. In these embodiments, multicarrier transmitter 100 may be part of a multiple-input multiple-output (MIMO) system. In some embodiments, each transmit antenna 114 may define one spatial channel. In these embodiments, each spatial channel may be used to communicate different time-domain samples on the same subcarriers as the other spatial channels, allowing the communication of additional data without an increase in frequency bandwidth. The use of spatial channels may take advantage of the multipath characteristics of the channel. In some embodiments, the spatial channels may be non-orthogonal channels, although the scope of the invention is not limited in this respect.

A multicarrier symbol, such as an OFDM symbol, transmitted by multicarrier transmitter 100 may be viewed as the combination of the symbols modulated on the individual subcarriers of all the spatial channels. In accordance with some embodiments, data for transmission by multicarrier transmitter 100 is provided to transmitter 100 in the form of bit stream 101. Encoder 102 may apply forward error correcting (FEC) codes to bit stream 101 to generate coded bits comprising bit stream 103. Bit interleaver 104 may perform an interleaving operation on a block of bits to generate interleaved blocks of bits. The blocks of bits may represent an OFDM symbol. In some embodiments, encoder 102 may use a code, such as a low-density parity check code (LDPC) that does not always require an interleaving operation.

The blocks or groups of bits from interleaver 104 may be converted from a serial form to a parallel form by data-stream selector 118 and provided to data-stream modulators 106. In some embodiments, multicarrier transmitter 100 may have a separate data-stream modulator 106 associated with each data stream. In these embodiments, data-stream selector 118 may select blocks of bits for each data stream and provide the selected blocks of bits to one of data-stream modulators 106. Multicarrier transmitter 100 illustrates three data-stream modulators 106 which may correspond to three data streams, however, as little as one, and up to four or more data-stream modulators may be included. As discussed in more detail below, a number of data streams (e.g., three) may be transmitted using a greater number of transmit antennas (e.g., four).

Each data-stream modulator 106 may include subcarrier modulators, such as quadrature amplitude modulation (QAM) modulators for each subcarrier frequency (i.e., tone) of the multicarrier communication channel. Data-stream selector 118 may provide a parallel group of bits to each data-stream modulator 106 associated one of the subcarriers. Each of data-stream modulator 106 may individually modulate the groups of bits on corresponding subcarriers to generate frequency-domain samples for an associated data stream. For example, a first data-stream modulator 106A may generate frequency-domain samples 107A for a first data stream comprising a subcarrier symbol for each subcarrier of the multicarrier channel, a second data-stream modulator 106B may generate frequency-domain samples 107B for a second data stream comprising a subcarrier symbol for each subcarrier of the multicarrier channel; and a third data-stream modulator 106C may generate frequency-domain samples 107C for a third data stream comprising a subcarrier symbol for each subcarrier of the multicarrier channel. Frequency-domain samples 107 may be referred to as frequency-domain symbol-modulated subcarriers of subcarrier symbols.

In some embodiments, data-stream modulators 106 may symbol-modulate the groups of bits based on a modulation level which may range from zero bits per symbol to up to ten or more bits per symbol. The modulation levels may include binary phase shift keying (BPSK), which communicates one bit per symbol, quadrature phase shift keying (QPSK), which communicates two bits per symbol, 8 PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Subcarrier modulation levels with higher data communication rates per subcarrier may also be used. In some embodiments, system controller 116 may provide modulation level information to data-stream selector 118 and data-stream modulators 106, although the scope of the invention is not limited in this respect. In some embodiments, data-stream modulators 106 may be generally referred to as QAM modulators.

Multicarrier transmitter 100 may also include inverse fast Fourier transformation (IFFT) circuitry 108. Each of IFFT circuitry 108 may be associated with one of data-stream modulators 106 for performing an IFFT on frequency-domain samples 107 for a particular data stream. IFFT circuitry 108 generates time-domain samples 109 for a particular data stream.

In some embodiments, IFFT circuitry 108 may perform almost any form of inverse discrete Fourier transform (IDFT). The number of time-domain samples 109 generated by IFFT circuitry 108 may be equal to the number of frequency components (subcarrier symbols) input thereto. In some embodiments, each of IFFT circuitry 108 may generate a time-domain waveform from the combination of frequency-domain symbol-modulated subcarriers input thereto. Circuitry, not separately illustrated, may convert the time-domain samples generated by the IFFT operation, which may be in a parallel form, to a serial form. In these embodiments, each of time-domain samples 109 may comprise serial streams of time-domain samples associated with a particular data stream.

Multicarrier transmitter 100 may also include cyclic shifting and combining circuitry 110 to cyclically shift and combine time-domain samples 109 of the different data streams to generate sets of output time-domain samples 111 for subsequent transmission on a corresponding one of antennas 114. In some embodiments, cyclic shifting and combining circuitry 110 may be responsive to control signals from controller 116 to determine whether or not to cyclically shift time-domain samples 109 of a particular data stream, and whether or not to combine time-domain samples 109 of one particular data stream with another one or more data streams. In some embodiments, system controller 116 may indicate an amount of shift to cyclically shift time-domain samples 109 of the data streams, although the scope of the invention is not limited in this respect. Cyclic shifting and combining circuitry 110 may generate one serial symbol stream of output time-domain samples 111 for each transmit antenna 114. Each serial symbol stream of output time-domain samples 111 can comprise a combination of time-domain samples 109 from one or more of the data streams. The operation of some embodiments of cyclic shifting and combining circuitry 110 is discussed in more detail below.

Radio-frequency (RF) circuitry 112 may RF modulate each of serial symbol streams of output time-domain samples 111 for subsequent RF transmission of a multicarrier signal by a corresponding one of antennas 114. In some embodiments that utilize four antennas, four of RF circuitry 112 may concurrently transmit output time-domain samples 111 on antennas 114 providing for the transmission of an OFDM symbol.

In some embodiments, each of antennas 114 may be associated with a spatial channel (but not necessarily a separate data stream) and may receive RF signals from an associated one of RF circuitry 112. Spatially diverse antennas 114 may be separated by a distance. In some embodiments, minimum separation distance may be based on the wavelength of the frequency spectrum used for communicating. In some embodiments, a separation of a few centimeters may be sufficient to help assure multipath differences between the spatial channels, although the scope of the invention is not limited in this respect. Antennas 114 may comprise one or more directional or omnidirectional antennas, including, for example, dipole antennas, monopole antennas, loop antennas, microstrip antennas or other types of antennas suitable for transmission of RF signals by multicarrier transmitter 100.

In some embodiments, multicarrier transmitter 100 may transmit an OFDM symbol on a communication channel within a predetermined frequency spectrum. The channel may comprise a plurality of orthogonal subcarriers. In some embodiments, the orthogonal subcarriers of a channel may be closely spaced subcarriers. To achieve orthogonality between the closely spaced subcarriers, the subcarriers of a particular channel may have null at substantially a center frequency of the other subcarriers of that channel.

In some embodiments, multicarrier transmitter 100 may transmit an OFDM symbol on a multicarrier communication channel having up to forty-eight or more orthogonal data subcarriers. In some of these embodiments, the multicarrier communication channel may have a bandwidth of approximately 20 MHz, although channels with greater or lesser bandwidths may also be suitable. In some embodiments, the frequency spectrums for a multicarrier communication channel may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

Figure 2:
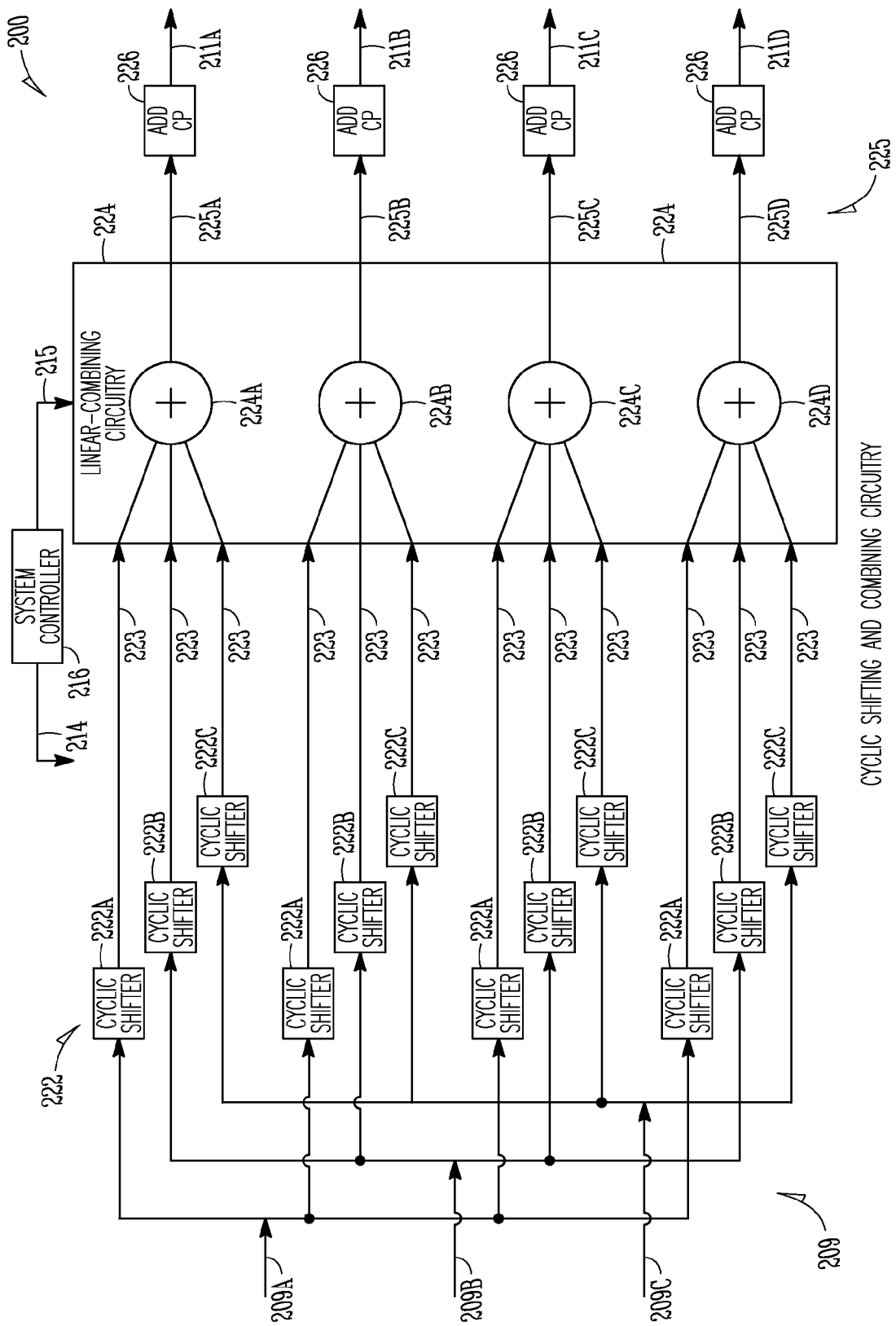
FIG. 2 is a block diagram of cyclic shifting and combining circuitry in accordance with some embodiments of the present invention.

FIG. 2 is a block diagram of cyclic shifting and combining circuitry in accordance with some embodiments of the present invention. Cyclic shifting and combining circuitry 200 may be suitable for use as cyclic shifting and combining circuitry 110 (FIG. 1), although other circuitry may also be suitable. Cyclic shifting and combining circuitry 200 may generate a linear combination of time-domain samples of two or more data streams, some of which may be cyclically shifted.

In some embodiments, cyclic shifting and combining circuitry 200 may comprise groups of cyclic shifters 222A, 222B and 222C which may introduce a cyclic shift in time, respectively, to input time-domain samples 209A, 209B and 209C. The shift in time may be equivalent to a linear phase shift in frequency. In some embodiments, cyclic shifting and combining circuitry 200 may comprise one cyclic shifter for each data stream. In the illustrated embodiments, first time-domain samples 209A may correspond to a first data stream (e.g. one of time-domain samples 109 (FIG. 1)), second time-domain samples 209B may correspond to a second data stream (e.g., a second of time-domain samples 109 (FIG. 1)), and third time-domain samples 209C may correspond to a third data stream (e.g., a third of time-domain samples 109 (FIG. 1)). Controller 216 may provide control signals 214 to individual cyclic shifters 222A, 222B and 222C indicating whether or not a cyclic shift should be introduced. Controller 216 may also provide control signals 214 to indicate an amount of cyclic shift to be introduced. In some embodiments, cyclic shifters 222A, 222B and 222C may refrain from introducing a cyclic shift to input time-domain samples 209. In some embodiments, controller 216 may correspond to controller 116 (FIG. 1).

Although FIG. 2 illustrates some embodiments of cyclic shifting and combining circuitry 200 for operation on three data streams, the scope of the invention is not limited in this respect. Embodiments of the present invention are equally suitable for operation on more than two data streams.

In some embodiments, cyclic shifting and combining circuitry 200 may also comprise linear-combining circuitry 224 which may including combiner elements 224A through 224D to linearly combine time-domain samples 223 from one or more of cyclic shifters 222 to generate output time-domain samples 225A through 225D. In some embodiments, linear-combining circuitry 224 may include a combiner element for each transmit antenna 114 (FIG. 1) of multicarrier transmitter 100 (FIG. 1). In some embodiments, combiner elements 224A through 224D may selectively combine time-domain samples 223 based on control signals 215 from controller 216. In this way, time-domain samples 223 for any particular one or more cyclic shifters 222 may be linearly combined in many ways. In some embodiments, combiner elements 224A through 224D may refrain from combining any one set of time-domain samples with other sets allowing any one of the other of time-domain samples 223 to be provided directly at the output.

In some embodiments, cyclic shifting and combining circuitry 200 may comprise cyclic-prefix (CP) adding circuitry 226 to add a cyclic prefix (CP) to output time-domain samples 225A through 225D to generate corresponding output time-domain samples 211A through 211D. In some embodiments, output time-domain samples 211A through 211D may correspond to one of output time-domain samples 111 (FIG. 1).

Although circuitry 200 and transmitter 100 (FIG. 2) are illustrated with three of IFFT circuitry 108, four groups of three cyclic shifters 222A, 222B and 222C, and four antennas 114 (FIG. 1) which may be suitable for cyclically shifting and combining time-domain samples of three data streams for transmission over up to four spatial channels (e.g., with four antennas), the scope of the invention is not limited in this respect. In other embodiments, transmitter 100 (FIG. 1) may include additional IFFT circuits and additional transmit antennas, and cyclic shifting and combining circuitry 200 may include additional cyclic shifters for cyclically shifting time-domain samples of additional data streams.

In some embodiments, controller 216 may instruct individual cyclic shifters to cyclically shift the input time-domain samples (i.e., 209A, 209B and/or 209C) a number of samples that may range from zero to five or more, although the scope of the invention is not limited in this respect.

In some embodiments, cyclic shifting and combining circuitry 200 may be fabricated with custom-designed logic. In some embodiments, cyclic shifters 222 may include a buffer to buffer time-domain samples 209 of each OFDM time-domain symbol. The samples may be read out of the buffer in a cyclically-delayed fashion, time-shifted from a first-in, first-out (FIFO) approach. In some embodiments, linear-combining circuitry 224 may comprise a bank of adders and circuitry 226 may add a cyclic prefix by reading samples of each OFDM time-domain symbol 225 into a buffer and prefixing the symbol by a duplicate of the last samples corresponding to the prefix length.

FIGS. 3A through 3E illustrate cyclic shifting and linear combining of time-domain samples in accordance with some embodiments of the present invention. FIG. 3A illustrates group 309A of time-domain samples 302 that may correspond to time-domain samples 209A (FIG. 2) at the input of cyclic shifter 222A (FIG. 2). FIG. 3B illustrates group 309B of time-domain samples 302 that may correspond to time-domain samples 209B (FIG. 2) at the input of cyclic shifter 222B (FIG. 2). In this illustration, group 309A of time-domain samples 302 may comprise a sequence of time-domain samples labeled $a_1$ through $a_{12}$, and group 309B of time-domain samples 302 may comprise a sequence of time-domain samples labeled $b_1$ through $b_{12}$. In these embodiments, the cyclic shifters may cyclically shift and/or delay some or most of the time-domain samples within the group.

In FIG. 3C, group 323A of time-domain samples corresponds to group 309A after being cyclically shifted by one of cyclical shifters 222A (FIG. 2), and in FIG. 3D, group 323B of time-domain samples corresponds to group 309B after being cyclically shifted by one of cyclical shifters 222B (FIG. 2). As illustrated in FIG. 3C, after cyclically shifting the time-domain samples of group 309A, time-domain samples $a_1$ through $a_{10}$ are delayed by two samples in group 323A, and time-domain samples $a_{11}$ and $a_{12}$ are now at the beginning of group 323A. As illustrated in FIG. 3D, after cyclically shifting the time-domain samples of group 309B, time-domain samples $b_1$ through $b_{10}$ are delayed by two samples in group 323B, and time-domain samples $b_{11}$ and $b_{12}$ are now at the beginning of group 323B. In both cases, this illustrates a cyclic delay or cyclic shift of two time-domain samples, although the scope of the invention is not limited in this respect.

In some embodiments, as part of the cyclic shifting, the cyclic shifters may remove one or more of the time-domain samples from the end of the group and may add the removed one or more time-domain samples to the beginning of the group. The cyclic shifting in effect, delays most of the time-domain samples of a group except for the last couple (e.g., $a_{11}$ and $a_{12}$, and $b_{11}$ and $b_{12}$ in this example). In some embodiments, the cyclic shifters may reorder individual time-domain samples 302 within the group by moving one or more of the time-domain from the end of the group to the beginning of the group.

Although FIGS. 3C and 3D illustrate a cyclic shift of two samples, the scope of the invention is not limited in this respect. In some embodiments, any cyclic shifter of groups of cyclic shifters 222A, 222B and 222C (FIG. 2) may refrain from cyclically shifting input groups of time-domain samples and simply pass the time-domain samples through to circuitry 224 (FIG. 2).

FIG. 3E illustrates the operation of linear-combining circuitry 224 (FIG. 2) and cyclic-prefix adding circuitry 226 (FIG. 2). In this example, group 325 of time-domain samples may correspond to linear-shifted and combined time-domain samples, such as time-domain samples 225A (FIG. 2). In these embodiments, time-domain samples $c_1$ through $c_{12}$ may represent a linear combination of time-domain samples $a_1$ through $a_{12}$ from group 323A and time-domain samples $b_1$ through $b_{12}$ from group 323B. In some embodiments, each time-domain sample from group 325 may be a linear combination of corresponding time-domain samples from groups 323A and 323B. For example, time-domain sample $c_{11}$ may be a linear combination of time-domain samples $a_{11}$ and $b_{11}$, time domain sample $c_{12}$ may be a linear combination of time-domain samples $a_{12}$ and $b_{12}$, and so forth. In some embodiments, each combiner element 224A, 224B, 224C and 224D (FIG. 2) may produce a corresponding group of time-domain samples, only one of which is illustrated in FIG. 3E.

Although group 325 is described as a linear combination of time-domain samples from groups 323A and 323B, the scope of the invention is not limited in this respect. In some embodiments, combiner elements 224A, 224B, 224C and 224D (FIG. 2) may refrain from combining samples and may simply pass the time-domain samples of one of the input groups on to cyclic-prefix adding circuitry 226 (FIG. 2).

In some other embodiments, the time-domain samples of group 325 may be linear combinations of all time-domain samples of groups 323A and group 323B, although the scope of the invention is not limited in this respect.

Cyclic-prefix adding circuitry 226 (FIG. 2) may add cyclic prefix 326 to a beginning of the group 325 after the operation of one of combiner elements 224A, 224B, 224C and 224D (FIG. 2). Adding cyclic prefix 326 may comprise repeating a portion of the output time-domain samples comprising group 325. In this illustration, time-domain samples $c_7$ through $c_{10}$ are the last samples of group 325 and are repeated as cyclic prefix 326. In some cases, the cyclic prefix may be copied from the end of a cyclically shifted and linearly combined group of time-domain samples provided by circuitry 224 (FIG. 2). Cyclic prefix 326 illustrates an example of cyclic prefix for a group of time-domain samples in which cyclic shifting and linear combining has been performed. Group 311 of time-domain samples may correspond to a group of output time-domain samples, such as output time-domain samples 211A, 211B, 211C or 211D (FIG. 2), which includes the cyclic prefix.

In some embodiments, the number of time-domain samples comprising a cyclic prefix may be a fraction of the IFFT size and may be selected to accommodate the delay spread of the channel. In some embodiments, the cyclic prefix may comprise a predetermined number of the time-domain samples, although the scope of the invention is not limited in this respect.

In some embodiments, the receiver of a communication station receiving the signals transmitted by transmitter 100 (FIG. 1) may be provided the number of data streams that are being transmitted. The cyclical delay and linear combination of the data streams may appear as channel delay to the receiver and therefore it may not be necessary to provide that information to the receiver, although the scope of the invention is not limited in this respect.

In some embodiments, for each data stream, multicarrier receiver 100 (FIG. 1) may be trained on each composite channel. Composite channels may be defined by matrices discussed in more detail below. Fixed training sequences may be transmitted orthogonally to each other for each composite channel allowing each composite channel to be trained sequentially in time so that the composite channels may be derived from the training sequences.

FIGS. 4A through 4E illustrate signal representations in the frequency domain in accordance with some embodiments of the present invention. Equation 402 (FIG. 4A) illustrates the transmission of two data streams by transmitter 100 (FIG. 1) using three transmit antennas in accordance with some embodiments of the present invention. Equation 404 (FIG. 4B) illustrates the transmission of two data streams by transmitter 100 (FIG. 1) using three transmit antennas in accordance with some other embodiments of the present invention. Equation 406 (FIG. 4C) illustrates the transmission of one data stream by transmitter 100 (FIG. 1) using up to four transmit antennas in accordance with some embodiments of the present invention. Equation 408 (FIG. 4D) illustrates the transmission of two data streams by transmitter 100 (FIG. 1) using four transmit antennas in accordance with some embodiments of the present invention. Equation 410 (FIG. 4E) illustrates the transmission of two data streams by transmitter 100 (FIG. 1) using four transmit antennas in accordance with some other embodiments of the present invention. In these equations, $x_1$ represents frequency-domain samples corresponding to a first data stream, $x_2$ represents frequency-domain samples corresponding to a second data stream, and $h_{xx}$ refers to elements of a channel matrix. The channel matrix may define possible signal paths through a communication channel to a receiver. Although equations 402-410 represent the frequency-domain equivalent signals for one particular subcarrier frequency, they are applicable to all subcarrier frequencies of a multicarrier communication signal.

According to equation 402, first time-domain samples representing a first data stream are transmitted without any cyclic shift on a first antenna, second time-domain samples representing a second data stream are transmitted without any cyclic shift on a second antenna, and time-domain samples generated by cyclically shifting and combining both the first and second time-domain samples are transmitted on a third antenna. In equation 402, the first element of matrix 412 illustrates in the frequency domain that time-domain samples of the first data stream are transmitted on a first antenna without any cyclic shift or combination with other data. The second element of matrix 412 illustrates in the frequency domain that time-domain samples of the second data stream are transmitted on a second antenna without any cyclic shift or combination with other data. The third element of matrix 412 illustrates in the frequency domain that both the time-domain samples of the first and second data streams are cyclically shifted and linearly combined for transmission on a third antenna. The third element of matrix 412 also shows a linear phase shift of theta ($\theta$) which is equivalent to a cyclic shift discussed above. Matrix 414 illustrates that after the cyclic training and combining, a 2×3 channel matrix turns into a 2×2 composite channel. As illustrated in equation 402, even though three signals are transmitted from three different transmit antennas, the receiver may see only two-distinct data steams.

According to equation 404, the first time-domain samples without any cyclic shift are linearly combined with cyclically shifted second time-domain samples for transmission on the first antenna, the first time-domain samples and the second time-domain samples are both cyclically shifted and combined for transmission on the second antenna, and the first time-domain samples are cyclically shifted and combined with the second time-domain samples without any cyclic shift. Referring to equation 404, the first element of matrix 416 illustrates in the frequency domain that the first data stream without a cyclic shift is combined with the second data stream after the second data stream was cyclically shifted. In this example, the cyclical shift provided to the time-domain samples comprising the second data stream is equivalent to a linear phase shift of $2\theta$. The second element of matrix 416 illustrates in the frequency domain that both the first and second data streams were cyclically shifted before being combined. The third element of matrix 416 illustrates in the frequency domain that the first data stream was cyclically shifted and combined with the second data stream without a cyclic shift. Matrix 417 illustrates that after the cyclic training and combining, a 2×3 channel matrix turns into a 2×2 composite channel. As illustrated in equation 404, even though three signals are transmitted from three different transmit antennas, the receiver may see only two-distinct data steams.

Matrix 418 of equation 406 illustrates that first time-domain samples of a first data stream are transmitted on the first antenna without any cyclical shift and that the first time-domain samples cyclically shifted with an equivalent linear phase shift of $\theta$ are transmitted on the second antenna. Matrix 418 of equation 406 also illustrates that the first time-domain samples cyclically shifted with an equivalent linear phase shift of $2\theta$ are transmitted on the third antenna, and that the first time-domain samples cyclically shifted with an equivalent linear phase shift of $3\theta$ are transmitted on the fourth antenna. Matrix 419 illustrates that after the cyclic training and combining, a 2×4 channel matrix turns into a 2×1 composite channel. As illustrated in equation 406, even though four signals are transmitted from four different transmit antennas, the receiver may see only one distinct data steam.

Matrix 420 of equation 408 illustrates that first time-domain samples of a first data stream are transmitted on the first antenna without any cyclical shift and that second time-domain samples of a second data stream are transmitted on the second antenna without any cyclical shift. Matrix 420 of equation 408 also illustrates that the first time-domain samples cyclically shifted with an equivalent linear phase shift of $\theta$ are transmitted on the third antenna, and that the second time-domain samples cyclically shifted with an equivalent linear phase shift of $\theta$ are transmitted on the fourth antenna. Matrix 421 illustrates that after the cyclic training and combining, a 2×4 channel matrix turns into a 2×2 composite channel. As illustrated in equation 408, even though four signals are transmitted from four different transmit antennas, the receiver may see only two-distinct data steams.

Matrix 422 of equation 410 illustrates that some combination of time-domain samples of three data streams (e.g., $x_1$, $x_2$, and $x_3$) are cyclically shifted and combined for transmission of each antenna. In these embodiments, the first time-domain samples of a first data stream are cyclically shifted with an equivalent linear phase shift of a multiple of $\theta_1$, the second time-domain samples of a second data stream are cyclically shifted with an equivalent linear phase shift of a multiple of $\theta_2$, and third time-domain samples of a third data stream are cyclically shifted with an equivalent linear phase shift of a multiple of $\theta_3$, prior to being linearly combined. Matrix 423 illustrates that after the cyclic training and combining, a 2×4 channel matrix turns into a 2×3 composite channel. As illustrated in equation 410, even though four signals are transmitted from four different transmit antennas, the receiver may see only three-distinct data steams.

In accordance with embodiments of the present invention, cyclic shifting and combining circuitry 200 (FIG. 2) may perform the cyclic shifting and linear combining of time-domain samples to achieve the equivalent frequency domain representations of matrix 412, matrix 416, matrix 418, matrix 420, and matrix 422. Other combinations of cyclic shifting and linear combining are also suitable. In some embodiments, controller 216 may be used to determine the specific combination of cyclic shifting and linear combining performed by cyclic shifting and combining circuitry 200 (FIG. 2).

Figure 5:
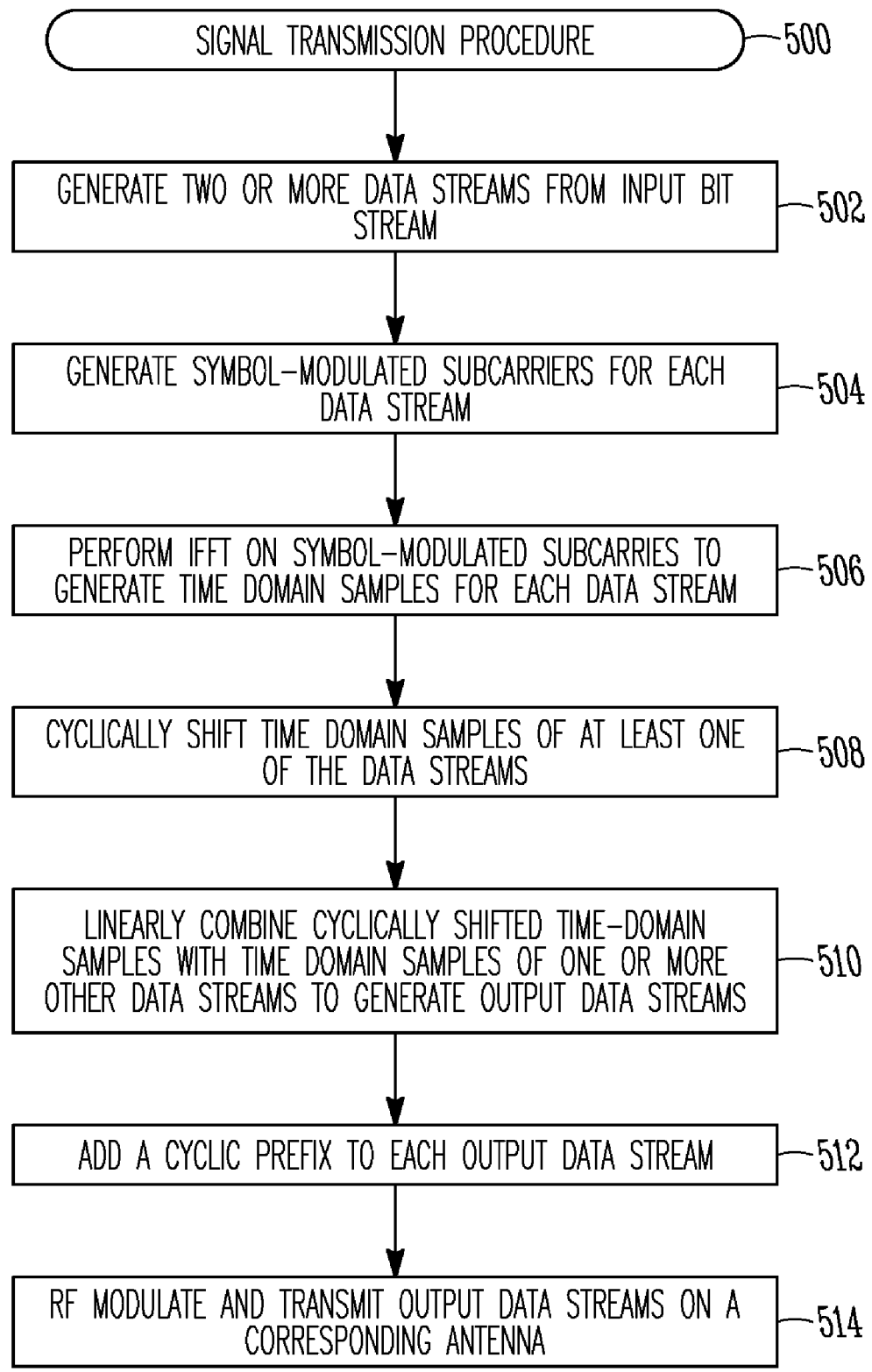
FIG. 5 is a flow chart of a signal transmission procedure in accordance with some embodiments of the present invention.

FIG. 5 is a flow chart of a signal transmission procedure in accordance with some embodiments of the present invention. Procedure 500 may be performed by a multicarrier transmitter, such as transmitter 100 (FIG. 1), although other transmitters may also be suitable. Procedure 500 may be used to transmit two or more data streams over more than two transmit antennas, although the scope of the invention is not limited in this respect.

Operation 502 comprises generating two or more data streams from an input bit stream. In some embodiments, operation 502 may be performed by bit interleaver 104 (FIG. 1), although the two or more data streams may be generated elsewhere. The data streams generated in operation 502 may correspond to data streams 105 (FIG. 1).

Operation 504 comprises generating symbol-modulated subcarriers (e.g., frequency-domain samples) from each data stream. Operation 504 may be performed by data-stream modulators 106 (FIG. 1) and the frequency-domain samples generated in operation 504 may correspond to frequency-domain samples 107 (FIG. 1).

Operation 506 comprises performing an IFFT on the symbol-modulated subcarriers for each data stream. Operation 506 may be performed by IFFT circuitry 108 (FIG. 1) for the symbol-modulated subcarriers of each data stream. In some embodiments with additional data streams, additional IFFTs may be performed. Operation 506 generates time-domain samples for each data stream which may correspond to time-domain samples 109 (FIG. 1).

Operation 508 comprises cyclically shifting the time-domain samples of at least one of the data streams. In some embodiments, operation 508 may cyclically shift the time-domain samples of the data streams in response to signals from a controller which may indicate an amount to cyclically shift the samples. In some embodiments, operation 508 may be performed by cyclic shifters 222 (FIG. 2).

Operation 510 comprises linearly combining the cyclically shifted time-domain samples from operation 508 with other time-domain samples. The other time-domain sample may also have been cyclically shifted, although the scope of the invention is not limited in this respect. Operation 510 generates output time-domain samples that may comprise linear combinations of cyclically shifted time-domain samples of data streams. In some embodiments, operation 510 may be performed by linear-combining circuitry 224 (FIG. 2). The output time-domain samples generated by operation 510 may correspond to time-domain samples 225A (FIG. 2) through 225D (FIG. 2).

Operation 512 comprises adding a cyclic prefix to each group of the output time-domain samples provided by operation 510. In some embodiments, cyclic-prefix adding circuitry 226 (FIG. 2) may be used to generate and add the cyclic prefix.

Operation 514 comprises RF modulating and transmitting the output time-domain samples on a corresponding transmit antenna. In some embodiments, operation 514 may be performed by RF circuitry 112 (FIG. 1).

Accordingly, procedure 500 allows two data streams, for example, to be transmitted on three or more antennas with redundancy, and three data streams, for example, to be transmitted on four or more antennas with redundancy. This may help reduce the multipath effects of the communication channel. Although the individual operations of procedure 500 are illustrated and described as separate operations, one or more of the individual operations may be performed concurrently, and nothing requires that the operations be performed in the order illustrated.

Referring back to FIG. 1, in some embodiments, multicarrier transmitter 100 may be part of a wireless communication device, such as a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, multicarrier transmitter 100 may transmit RF communications in accordance with specific communication standards, such as the Institute of Electrical and Electronics Engineers (IEEE) standards including IEEE 802.11(a), 802.11(b), 802.11(g/h) and/or 802.11(n) standards for wireless local area networks (WLANs) and/or 802.16 standards for wireless metropolitan area networks (WMANs), although multicarrier transmitter 100 may also be suitable to transmit communications in accordance with other techniques including the Digital Video Broadcasting Terrestrial (DVB-T) broadcasting standard, and the High performance radio Local Area Network (Hiper-LAN) standard.

Although some embodiments of the present invention are discussed in the context of an 802.11x implementation (e.g., 802.11a, 802.11g, 802.11 HT, etc.), the scope of the present invention is not limited in this respect. Some embodiments of the present invention may be implemented as part of any wireless system using multicarrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

Although multicarrier transmitter 100 and circuitry 200 (FIG. 2) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

What is claimed:

1. A multicarrier transmitter comprising:
   inverse fast Fourier transformation (IFFT) circuitry to generate first and second time-domain samples respectively from first and second data streams; and
   cyclic shifting and combining circuitry to:
   cyclically shift the first time-domain samples;
   combine the cyclically-shifted first time-domain samples with the second time-domain samples for subsequent transmission on a first antenna;
   cyclically shift the second time-domain samples; and
   combine the first time-domain samples with the cyclically-shifted second time-domain samples for subsequent transmission on a second antenna.

2. The transmitter of claim 1 wherein the cyclic shifting and combining circuitry is further configured to combine the cyclically-shifted first time-domain samples with the cyclically-shifted second time-domain samples for subsequent transmission on a third antenna.

3. The transmitter of claim 1
   wherein the signals transmitted by the antennas comprise a multicarrier communication signal, and
   wherein the cyclic shifts are performed in the time domain to represent linear phase-shifts in the frequency domain.

4. The transmitter of claim 3 wherein the first time-domain samples comprise a group of time-domain samples, and
   wherein the cyclic shifting and combining circuitry delays some of the time-domain samples within the group.

5. The transmitter of claim 4 wherein cyclic shifting and combining circuitry removes one or more of the time-domain samples from an end of the group and adds the removed one or more time-domain samples to a beginning of the group.

6. The transmitter of claim 4 wherein a linear combination of the cyclically-shifted first time-domain samples and the second time-domain samples comprise output time-domain samples for subsequent radio-frequency (RF) transmission by a first transmit antenna.

7. The transmitter of claim 6 further comprising cyclic-prefix adding circuitry to add a cyclic prefix to the output time-domain samples the cyclic prefix comprising repeating a portion of the output time-domain samples.

8. The transmitter of claim 6 further comprising:
   first inverse fast Fourier transformation (IFFT) circuitry to performing an IFFT on a first set of frequency-domain samples to generate the first time-domain samples;
   second IFFT circuitry to perform an IFFT on a second set of frequency-domain samples to generate the second time-domain samples; and
   RF circuitry to transmit the output time-domain samples on a multicarrier communication signal comprising a plurality of subcarrier frequencies.

9. A multicarrier transmitter comprising:
   inverse fast Fourier transformation (IFFT) circuitry to generate first and second time-domain samples; and
   cyclic shifting and combining circuitry to cyclically shift and combine the first and second time-domain samples for subsequent transmission,
   wherein the cyclic shifting and combining circuitry comprises first and second cyclic shifters and wherein the transmitter further comprises a controller to instruct the first cyclic shifter whether or not to cyclically shift the first time-domain samples, the first time-domain samples representing a first data stream,
   wherein the controller is to further instruct the second cyclic shifter whether or not to cyclically shift the second time-domain samples, the second time-domain samples representing a second data stream.

10. The transmitter of claim 9 wherein the cyclic shifting and combining circuitry further comprises first, second and third combiner circuits, and wherein the controller is to further instruct the first combiner circuit whether or not to combine the first time-domain signals from the first cyclic shifter with the second time-domain signals from the second cyclic shifter to generate first output time-domain samples for transmission on a first antenna, wherein the controller is to further instruct the second combiner circuit whether or not to combine the first time-domain signals from the first cyclic shifter with the second time-domain signals from the second cyclic shifter to generate second output time-domain samples for transmission on a second antenna.

11. The transmitter of claim 10 wherein the controller is to further instruct the third combiner circuit whether or not to combine the first time-domain signals from the first cyclic shifter with the second time-domain signals from the second cyclic shifter to generate third output time-domain samples for transmission on a third antenna.

12. The transmitter of claim 10 wherein the controller is to further instruct at least one of the first and second cyclic shifters to cyclically shift the input time-domain samples a predetermined number of samples, and wherein the transmitter further comprises circuitry to add a first cyclic prefix to the first output time-domain samples prior to transmission on the first antenna, the first cyclic prefix repeating a portion of first output time-domain samples, and circuitry to add a second cyclic prefix to the second output time-domain samples prior to transmission on the second antenna, the second cyclic prefix repeating a portion of second output time-domain samples.

13. A multicarrier transmitter comprising:

inverse fast Fourier transformation (IFFT) circuitry to generate first and second time-domain samples; and cyclic shifting and combining circuitry to cyclically shift and combine the first and second time-domain samples for subsequent transmission, wherein the cyclic shifting and combining circuitry comprises:

a cyclic shifter to cyclically shift the first time-domain samples; and combiner circuitry to linearly combine the cyclically-shifted first time-domain samples with the second time-domain samples for subsequent transmission on a first of a plurality of transmit antennas, wherein the cyclic shifter is a first cyclic shifter, and wherein the multicarrier transmitter further comprises:

a second cyclic shifter to cyclically shift the second time-domain samples prior to being linearly combined with the cyclically shifted first time-domain samples to generate output time-domain samples for transmission on a first of a plurality of transmit antennas;

first radio-frequency (RF) circuitry to transmit the output time-domain samples on a first antenna;

second RF circuitry to transmit the first time-domain signal without a cyclical shift on a second of the antennas; and third RF circuitry to transmit the second time-domain signal without a cyclical shift on a third of the antennas.

14. A method for transmitting multicarrier communication signals comprising:

generating first and second time-domain samples respectively from first and second data streams;

cyclically shifting the first time-domain samples;

combining the cyclically-shifted first time-domain samples with the second time-domain samples for subsequent transmission on a first antenna;

cyclically shifting the second time-domain samples; and combining the first time-domain samples with the cyclically-shifted second time-domain samples for subsequent transmission on a second antenna.

15. The method of claim 14 wherein the signals transmitted by the first and second antennas comprise a multicarrier communication signal.

16. The method of claim 14 further comprising combining the cyclically-shifted first time-domain samples with the cyclically-shifted second time-domain samples for subsequent transmission on a third antenna.

17. The method of claim 14 wherein the cyclically shifting is performed in the time domain and represents a linear phase-shift in the frequency domain.

18. The method of claim 17 wherein the first time-domain samples comprise a group of time-domain samples, and wherein the cyclically shifting comprises delaying some of the time-domain samples within the group.

19. The method of claim 18 wherein cyclically shifting comprises removing one or more of the time-domain samples from an end of the group and adding the removed one or more time-domain samples to a beginning of the group.

20. The method of claim 19 wherein linearly combining the cyclically-shifted first time-domain samples with the second time-domain samples generate output time-domain samples for subsequent radio-frequency (RF) transmission by a first transmit antenna.

21. The method of claim 20 further comprising adding a cyclic prefix to the output time-domain samples, the cyclic prefix comprising repeating a portion of the output time-domain samples.

22. The method of claim 20 further comprising:

performing an inverse fast Fourier transformation (IFFT) on a first set of frequency-domain samples to generate the first time-domain samples;

performing an IFFT on a second set of frequency-domain samples to generate the second time-domain samples; and transmitting the output time-domain samples on a multicarrier communication signal comprising a plurality of subcarrier frequencies.

23. A method for transmitting multicarrier communication signals comprising:

cyclically shifting first time-domain samples;

combining the cyclically-shifted first time-domain samples with second time-domain samples for subsequent transmission;

cyclically shifting the second time-domain samples prior to linearly combining with the cyclically shifted first time-domain samples to generate output time-domain samples for transmission on a first of a plurality of transmit antennas; and concurrently transmitting the output time-domain samples on a first antenna, the first time-domain signal without a cyclical shift on a second of the antennas, and the second time-domain signal without a cyclical shift on a third of the antennas.

24. A method for transmitting multicarrier communication signals comprising N data streams with N+1 antennas where N is either 2 or 3, the method comprising:

cyclically shifting first and second time-domain samples in a first manner and combining the cyclically shifted samples for transmission on a first antenna;

cyclically shifting the first and second time-domain samples in a second manner different from the first manner and combining the cyclically shifted samples for transmission on a second antenna; and cyclically shifting the first and second time-domain samples in a third manner different from the first and second manners and combining the cyclically shifted samples for transmission on a third antenna, wherein the first and second time-domain samples correspond respectively to first and second data streams.

* * * * *

UNITED STATES PATENT AND TRADEMARK OFFICE
CERTIFICATE OF CORRECTION

PATENT NO. : 7,436,903 B2
APPLICATION NO. : 10/954734
DATED : October 14, 2008
INVENTOR(S) : Sandhu et al.

It is certified that error appears in the above-identified patent and that said Letters Patent is hereby corrected as shown below:

In column 12, lines 21-22, in Claim 3, delete "wherein the signals transmitted by the antennas comprise a multicarrier communication signal, and" and insert the same on Line 20, after "Claim 1" as a continuation of the same line.

In column 14, lines 9-10, in Claim 15, delete "wherein the signals transmitted by the first and second antennas comprise a multicarrier communication signal." and insert the same on Line 8, after "claim 14" as a continuation of the same line.

Signed and Sealed this

Thirtieth Day of December, 2008

JON W. DUDAS
*Director of the United States Patent and Trademark Office*